United States Patent [19]

Giacometti et al.

[11] 4,056,437
[45] Nov. 1, 1977

[54] FAST REACTOR CORE

[75] Inventors: Christian Giacometti; Jean-Claude Mougniot, both of Manosque; Jean Ravier, Venelles, all of France

[73] Assignee: Commissariat a l'Energie Atomique, Paris, France

[21] Appl. No.: 616,132

[22] Filed: Sept. 24, 1975

[30] Foreign Application Priority Data

Sept. 30, 1974 France .................................. 74.32882

[51] Int. Cl.² .................................................. G21C 1/02
[52] U.S. Cl. ........................................ 176/40; 176/18
[58] Field of Search .............................. 176/17, 18, 40

[56] References Cited

U.S. PATENT DOCUMENTS

| 2,992,174 | 7/1961 | Edlund et al. | 176/18 |
| 3,140,234 | 7/1964 | Loewenstein | 176/40 |
| 3,140,237 | 7/1964 | Peterson et al. | 176/18 |
| 3,141,827 | 7/1964 | Iskenderian | 176/40 |
| 3,255,083 | 6/1966 | Klahr | 176/40 |
| 3,341,420 | 9/1967 | Sevy | 176/18 |
| 3,351,532 | 11/1967 | Raab, Jr., et al. | 176/17 |
| 3,362,882 | 1/1968 | Sofer et al. | 176/40 |
| 3,396,078 | 8/1968 | Visner | 176/40 |
| 3,660,227 | 5/1972 | Ackroyd et al. | 176/40 |
| 3,664,923 | 5/1972 | Connolly | 176/40 |

Primary Examiner—Harvey E. Behrend
Attorney, Agent, or Firm—McNenny, Pearne, Gordon, Gail, Dickinson & Schiller

[57] ABSTRACT

In the core of a fast breeder reactor, an inner zone having a heterogeneous structure and a given enrichment is surrounded by a zone of fertile material constituting an outer blanket. The inner zone is made up of coaxial cylindrical layers arranged alternately in the radial direction and formed by vertical assemblies of fissile and fertile material in succession.

1 Claim, 6 Drawing Figures

FAST REACTOR CORE

This invention relates to a novel concept for the arrangement of the core of a fast reactor or breeder reactor.

It is known that the core of a reactor of this type is usually made up of an inner zone containing fissile material, said inner zone being completely surrounded by an outer zone containing fertile material known as the blanket.

By way of example, the core of the Phenix reactor which is now in operation thus comprises so-called "fissile" fuel assemblies disposed in coaxial cylindrical layers in the central portion of the core, each fuel assembly being constituted by a bundle of vertical pins placed within an open-ended fuel wrapper which serves to handle the assembly and to ensure suitable positioning of this latter within the reactor core while at the same time guiding the fluid which serves to cool the fuel pins. Each fuel pin has a central region containing fissile material and surrounded by fertile material on each side. The depth of the fertile material is sufficient to constitute the top and bottom axial blankets which form part of the overall blanket whilst the remainder is constituted by a lateral blanket.

Again in the case of the Phenix reactor, the central region of each fuel pin in the inner zone is constituted by a column of pellets of mixed oxide of plutonium and either natural or depleted uranium, that is, an intimate mixture of fissile and fertile materials. The top and bottom regions of the fuel pin within the same fuel can are constituted by a column of pellets of fertile depleted or natural uranium oxide. The so-called "fertile" fuel assemblies are then placed around the central zone, also in concentric and coaxial layers, each fertile assembly being constituted by a bundle of pins contained in an open-ended wrapper in the same manner as the fissile assemblies. Each of these pins contains only fertile material in the form of a column of natural or depleted uranium oxide pellets. In this conventional design, the reactor core and especially the central portion of this latter can comprise one or a number of zones in which the fuel concentrations or enrichments are different, the concentration being defined by the ratio of quantity of fissile material to quantity of total fissile and fertile material contained in the zone considered.

It is also known that, in an installation of this type, an extremely important factor from a reactor economy standpoint is constituted by what is known as the "total breeding gain" (TBG). This is defined by the difference between the quantity of equivalent $^{239}$Pu formed and the quantity of equivalent $^{239}$Pu destroyed in the reactor, this difference being related to a heavy atom which has undergone fission. In point of fact, in fast reactors of conventional design, the total breeding gain of the fuel is positive but usually limited. In consequence, the doubling time of the reactor, which is the time required for feeding the excess fuel production to the cycle of a new fast reactor of the same power, is usually of appreciable length since the doubling time is in fact dependent on the total fissile mass in the fuel cycle and on the total breeding gain (TBG).

The present invention is directed to a novel arrangement of a fast breeder reactor core which makes it possible in particular to achieve an enhanced total breeding gain and consequently to limit the reactor doubling time to a considerable extent.

To this end, the invention relates to a fast reactor core comprising an inner zone surrounded by a zone of fertile material constituting an outer blanket, wherein the inner zone having a heterogeneous structure is constituted with a given enrichment by coaxial cylindrical layers arranged alternately in the radial direction and formed by vertical assemblies of fissile and fertile material in succession.

As an advantageous feature, the reactor core in accordance with the invention comprises a single enrichment within the inner zone. However, the invention is not limited to this embodiment since reactor cores comprising a plurality of enrichment zones can also be comtemplated.

In accordance with a particular feature of the invention, the vertical assemblies may be constituted by an alternate arrangement of superposed beds of fissile and fertile material. Moreover, the coaxial layers within the inner zone can be either continuous or non-continuous.

A more complete understanding of this invention will be obtained from the following description of one exemplified embodiment which is given by way of indication without any implied limitation, reference being made to the accompanying drawings, wherein.

Figure 2:
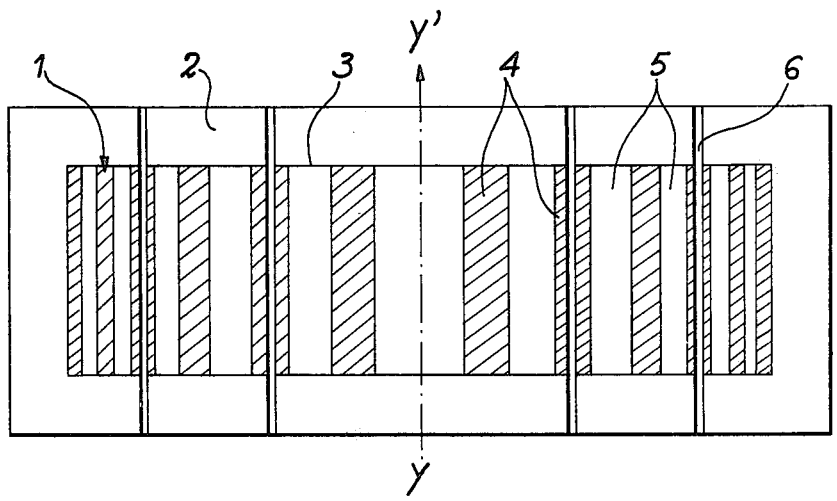
FIG. 2 is a diagrammatic vertical sectional view of a preferred embodiment of the invention.
Figure 6:
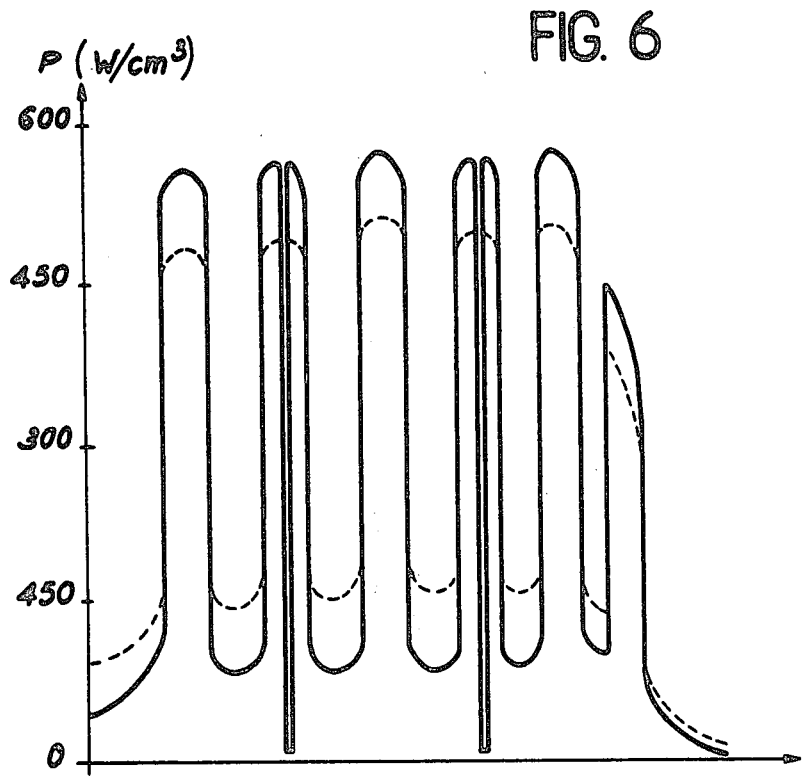

FIG. 6 gives the radial power distribution in the case of a reactor core having a heterogeneous inner zone in accordance with FIG. 2.

Figure 1:
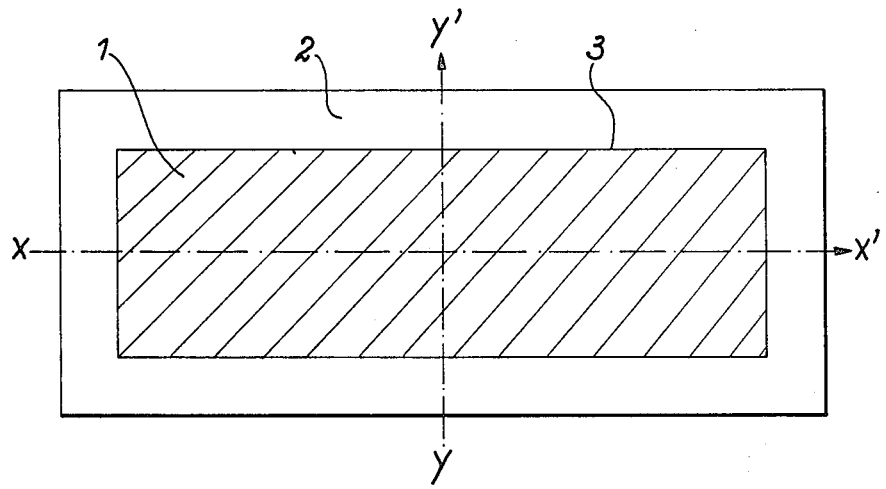
FIG. 1 is a diagrammatic vertical sectional view of a fast breeder reactor core in accordance with a conventional arrangement.

A conventional reactor core as shown in FIG. 1 is constituted by an inner fissile zone 1 which is completely surrounded externally of the dividing line 3 by an outer fertile zone 2 which constitutes the core blanket. The reactor core is of revolution about the axis Y-Y' whilst the assemblies (not shown in the drawings) which contain the necessary fissile and fertile materials are arranged in coaxial layers in sharply differentiated regions. In this conventional design concept, the inner zone 1 has one or two separate regions in which the fuel enrichments within the assemblies are different. The central zone of the reactor core is represented schematically by the axis X-X'.

In accordance with the invention, FIG. 2 illustrates the manner in which the fertile material can be introduced into the interior of the inner fissile zone in order to achieve in this case a heterogeneous "mixing" of said fissile zone with the fertile material. The inner zone 1 is preferably constituted by a succession of coaxial layers of fissile and fertile materials as designated respectively by the references 4 and 5. The control-rod locations are designated by the reference 6.

This arrangement is particularly straightforward since the fuel assemblies employed in the construction of the reactor core can be of only two types depending on whether they form part of a fissile zone or of a fertile zone whilst a suitable alternate arrangement of two types of assemblies starting from the axix Y-Y' of the reactor core is ensured at the time of loading. This naturally results in simplification of fabrication requirements.

Figure 3:
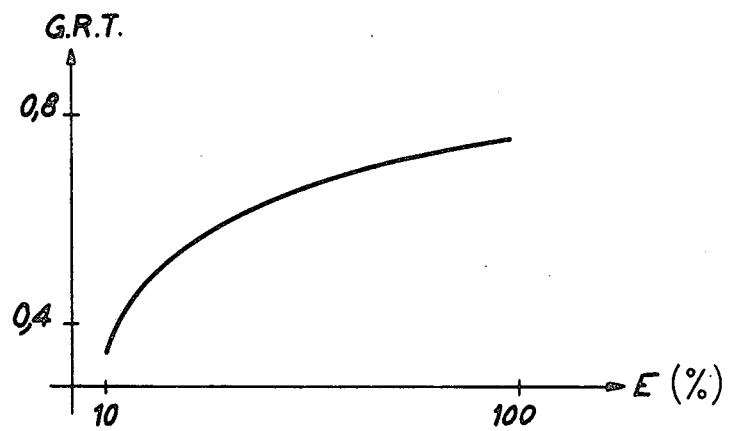
FIG. 3 is a curve showing the progressive variation in the total breeding gain of a breeder reactor as a function of the fuel enrichment or concentration.

On condition that the fertile blanket 2 has a sufficient thickness to reduce neutron leakage from the inner zone 1, it is then found that the total breeding gain (TBG) is higher as the concentration of fissile material in the fuel is greater. This property results from the curve shown in FIG. 3.

In the conventional design concept as illustrated in FIG. 1, the concentration of fissile material in the fuel is usually reduced with the size of the reactor core and consequently with the breeding gain (BG). However, in the heterogeneous concept in accordance with the invention it is possible in the case of an identical neutron leak rate to choose any desired concentration irrespective of the size of the reactor, simply by inserting the fertile material to a greater or lesser extent within the inner zone 1.

Figure 4:
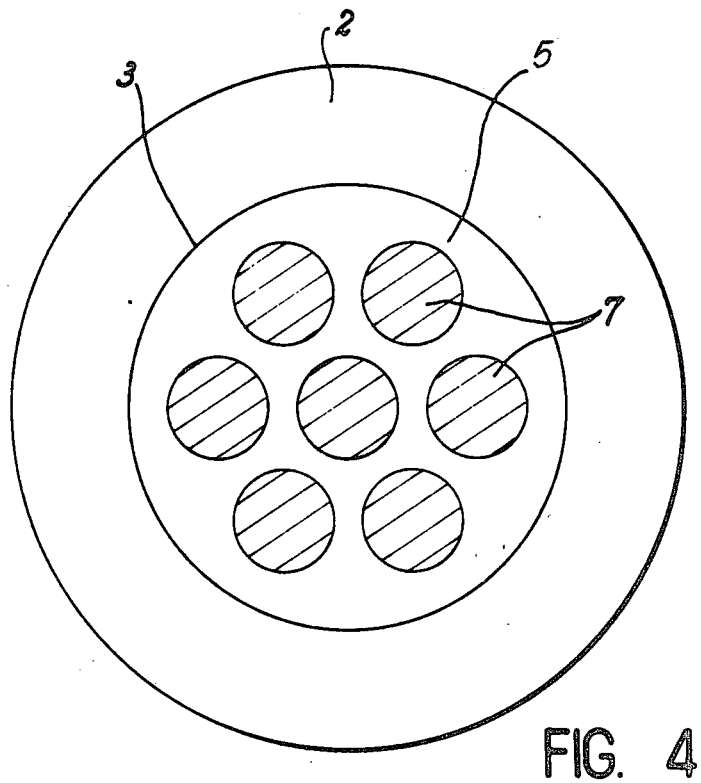
FIG. 4 is a transverse sectional view of another alternative embodiment.
Figure 5:
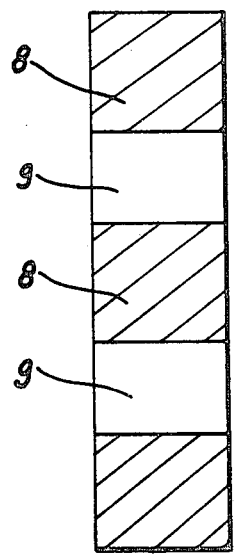
FIG. 5 shows diagrammatically an alternative arrangement of the reactor core shown in FIGS. 2 or 4.

In another alternative embodiment shown in FIG. 4, the fissile assemblies which are distributed within the inner zone can be disposed in non-continuous rings so as to form successive islands 7 in suitably spaced relation. Moreover, in the continuous rings shown in FIG. 2 or the non-continuous rings shown in FIG. 4 within each fissile assembly, the fissile material can be divided into eight superposed beds (as shown in FIG. 5) with interposition of layers 9 of fertile material, enhanced fertile-fissile mixing of the inner zone 1 being thus achieved.

The arrangements according to the invention also make it possible to establish that, by means of the production of fissile material and especially of plutonium from $^{238}$Uranium in the layers of fertile material introduced within the inner zone, the "internal breeding gain" (IBG)g which defines the gain in fissile material throughout the inner zone makes it possible to obtain an overall activity change within the reactor core which can be reduced to zero and even made positive if necessary. This exceptional property accordingly permits a considerable reduction in the number of reactor control rods which are necessary and consequently makes it possible to limit neutron losses in control rods. The total breeding gain is thereby appreciably enhanced and the same applies to the doubling time. It should nevertheless be noted that in the case of the figure, the value of the internal breeding gain (IBG)g must be such as to ensure that plutonium breeding compensates for the plutonium loss resulting from fission and the fission-product poisoning effect. It is therefore customary practice to adopt an internal breeding gain (IBG)g having a value which is slightly positive and especially in the vicinity of 0.05.

A further advantage of the arrangements in accordance with the invention compared with conventional reactors of the type illustrated in FIG. 1 and comprising two enrichment zones without inner fertile layers arises from the possibility of power flattening which is improved by means of a judicious arrangement of the fertile layers 3 within the inner zone 1. This property is confirmed by a study of the curve given in FIG. 6 which will be commented upon in the description of a particular example of application given hereinafter.

Moreover, the adoption of a higher enrichment in the reactor core is conducive to lower fluence. This constitutes an eminently favorable factor from the point of view of resistance of fuel-pin cans and assembly wrappers. It is in fact known that fluence is proportional to the product of neutron flux and time, the effects on structural materials within the reactor core and in particular on fuel assembly cans being usually taken into account by calculating the integrated dose in displacements per atom (DPA). It is also known that the linear power supplied by a fuel pin within the reactor core is fixed by design; this power is proportional in a general sense to the product of enrichment or concentration and neutron flux with a coefficient of proportionality which utilizes the fission cross-section of the fuel-pin material. It is apparent under these conditions that, if the enrichment increases as is permitted by the conditions of application of this invention, there is a decrease in the neutron flux and consequently in the fluence in conjunction with a correlative limitation of the effect of swelling of the fuel cans and metallic structures which are present within the reactor core.

It is worthy of note that the invention makes it possible to provide within the reactor core an appreciably enhanced void coefficient for the coolant which is employed and usually consists of a liquid metal such as sodium, the improvement thereby achieved being such that the increase in reactivity which results from accidental removal of the coolant is smaller than in the conventional design.

A final advantage offered by the invention lies in the fact that, by virtue of the negligible or even zero variation in the internal breeding gain (IBG)g, the duration of the fuel cycle within the reactor core can be given any desired value and can even attain the lifetime of the fuel.

By way of indication, the following data correspond to one example of application of a reactor core in accordance with the configuration illustrated in FIG. 2.

| | |
|---|---|
| Volumetric percentage-fuel (fissile material): | |
| steel (cladding and structure) | 22.3 % |
| sodium (coolant) | 40.6 % |
| fuel (UO$_2$ + PuO$_2$) | 32.9 % |
| Volumetric percentage (fertile material): | |
| steel | 19.2 % |
| sodium | 27.8 % |
| fertile material | 50.5 % |
| Height of fuel | 100 cm |
| Linear power in fuel | 500 W/cm |
| Maximum burn-up | 115,000 MWd/T |
| Thickness of axial and radial blankets in the outer zone | 50 cm |
| Diameter of fuel pellets in fuel pins | 5.5 mm |
| Concentration or enrichment ($\frac{PuO_2}{PuO_2+UO_2}$) | 33.5 % |
| Number of control rods | 12 |

In the case of an example as contemplated in the foregoing, FIG. 6 provides a diagram of the power in the central plane of the reactor core at the beginning and at the end of a cycle (curves in full lines and in dashed lines), the cycle adopted being 308 days representing an exceptionally high load factor of 0.84. The perfect flattening of these curves can readily be observed. The performances of the reactor core are accordingly as follows:

| | |
|---|---|
| Variation in reactivity after 308 days of irradiation | + 250 pcm |
| Total breeding gain (TBG) | 0.47 |
| Internal breeding gain (IBG) g | 0.031 |
| Compound doubling time | 12 years |
| Core sodium voiding effect | + 700 pcm |
| Total flattening factor | 1.42 |
| Integrated dose in displacements per atom (DPS) | 70 |

It is wholly apparent that the invention is not limited specifically to the example described with reference to the accompanying drawings but extend on the contrary to all alternative forms. In particular, although the fissile and fertile materials have been more especially considered to correspond to the $^{239}Pu - ^{238}U$ pair, the advantages of the arrangements contemplated in the foregoing are of immediate interest in the utilization of the $^{232}Th - ^{233}U$ pair in a fast reactor of the type comprising a heterogeneous core in accordance with the invention.

What we claim is:

1. A fast reactor core comprising:

an inner zone of a single enrichment having a heterogeneous structure with a vertical axis about which is arranged a distribution of fissile material and fertile material alternating in a radial direction from said vertical axis, said distribution and enrichment providing an internal breeding gain within said inner zone that at most results in a total reactivity change that is slightly positive; and an outer zone of fertile material surrounding said inner zone, said core having the following characteristics:

| | |
|---|---:|
| Volumetric percentage - fuel (fissile material) : | |
| steel (cladding and structure) | 22.3 % |
| sodium (coolant) | 40.6 % |
| fuel ($UO_2$ + $PuO_2$) | 32.9 % |
| Volumetric percentage (fertile material) : | |
| steel | 19.2 % |
| sodium | 27.8 % |
| fertile material | 50.5 % |
| Height of fuel | 100 cm |
| Linear power in fuel | 500 W/cm |
| Maximum burn-up | 115,000 MWd/T |
| Thickness of axial and radial blankets in the outer zone | 50 cm |
| Diameter of fuel pellets in fuel pins | 5.5 mm |
| Concentration of enrichment ($\frac{PuO_2}{PuO_2 + UO_2}$) | 33.5 % |
| Number of control rods | 12 |
| Variation in reactivity after 308 days of irradiation | + 250 pcm |
| Total breeding gain (TBG) | 0.47 |
| Internal breeding gain (IGB)g | 0.031 |
| Compound doubling time | 12 years |
| Core sodium voiding effect | + 700 pcm |
| Total flattening factor | 1.42 |
| Integrated dose in displacements per atom (DPA) | 70 |

* * * * *